United States Patent Office 3,364,657
Patented Jan. 23, 1968

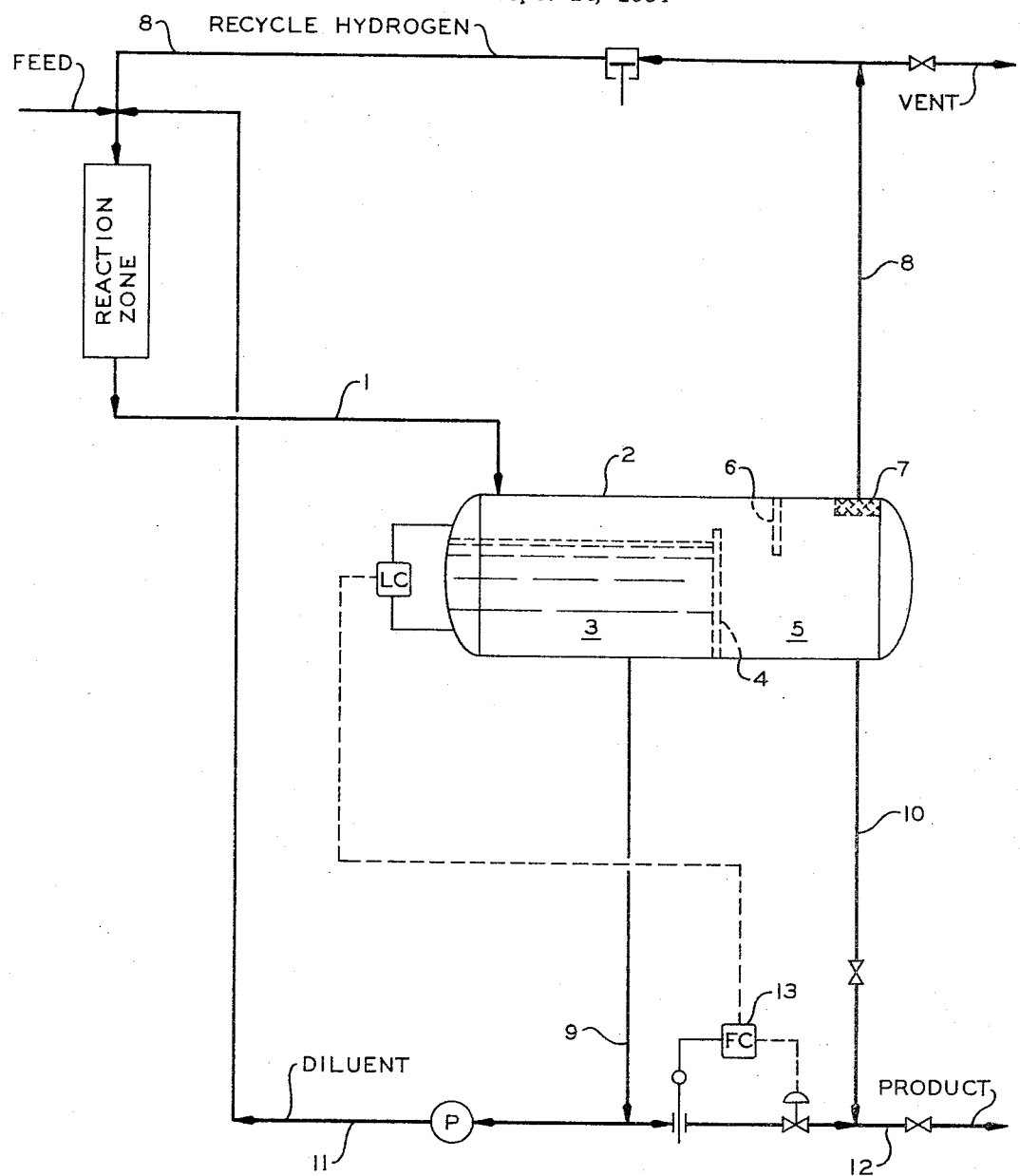

3,364,657
LIQUID-VAPOR SEPARATION
Miles L. Henderson, Bartlesville, Okla., assignor to Phillips Petroleum Company, a corporation of Delaware
Filed Sept. 14, 1964, Ser. No. 396,240
1 Claim. (Cl. 55—164)

This invention relates to a liquid-vapor separation apparatus. In one of its aspects, it relates to a liquid-vapor separation vessel comprising an elongated shell, a first section comprising an area where liquid is grossly separated from vapor, a dam which retains separated liquid in said first section, a baffle plate downstream from said dam and in said second section, said baffle plate providing an unobstructed tortuous path for vapor containing entrained liquid particles, a mist extractor being downstream from said baffle and being located at the top of said liquid vapor separation vessel. In another of its aspects, the invention relates to a method for preventing excess condensable hydrocarbonaceous materials from collecting in a mist extractor which is in the downstream top portion of a separator vessel in which liquids are separated from vapors and the vapors so separated contain some entrained liquid which comprises passing the vapors containing liquid through a non-obstructed tortuous path, and then passing said vapors through said mist extractor. In another of its aspects, the invention relates to separating a benzene hydrogenation process effluent comprising hydrogen and $C_1$–$C_6$ hydrocarbons which comprises passing said effluent to a separation vessel, grossly separating a portion of said $C_1$ to $C_6$ hydrocarbons as liquid in a first section of said separation vessel, passing the hydrogen containing some entrained $C_1$ to $C_6$ hydrocarbon through an unobstructed tortuous path so that at least a portion of said $C_1$ to $C_6$ hydrocarbons entrained in said hydrogen coalesce and separate from said hydrogen in a second portion of said separation vessel, passing the hydrogen through a mist extraction zone, and recycling said hydrogen to the benzene hydrogenation process. In a still further aspect of the invention, it relates to a separation vessel for separating hydrogen from $C_5$ to $C_6$ hydrocarbons comprising a horizontal elongated shell with a first section containing a dam to retain a major portion of the liquid hydrocarbons, a second section downstream from said first section, said second section containing a downwardly extending baffle extending from a point at the top of said separation vessel in said second section downwardly to a point below the height of said dam in said first section so as to provide a tortuous path for the vapors containing entrained liquid, a mist extractor on the top of said separation vessel positioned downstream from said downwardly extended baffle.

In the hydrogenation of benzene, it is necessary to provide a simple and efficient separation of the reaction products and the unreacted products so that the reactant to the reaction products can be further processed and the unreacted products can be recycled. It is desirable, for example, to separate unreacted hydrogen from the liquid products such as cyclohexane and unreacted benzene if present so that the hydrogen can be recycled to the reaction. In the conventional separation vessel, a section is provided wherein the $C_6$ hydrocarbons separate from the hydrogen as liquid and the hydrogen is passed to a second section of the separation vessel wherein it is passed through a mist extractor and recycled to the reaction. When the hydrogen-cyclohexane liquid separation takes place in the separation vessel, a large amount of mist forms and this mist must be removed by the mist extractor. It is thus necessary to provide frequent servicing of the mist extractor so that it remains operable. It is desirable to provide a simple method of separating from the vapor some of the mist before it reaches the mist extractor.

According to the invention, a downwardly extending baffle plate is provided upstream from the mist extractor and extending from the top of the separation vessel downwardly to a point below the top of a dam which holds the liquids in the first section and downstream from said dam. In this way, a tortuous unobstructed path is provided for the hydrogen containing entrained liquids and at least a portion of the liquids entrained in the vapors are coalesced prior to reaching the mist extractor.

It is an object of this invention to provide an apparatus for separating liquid from vapor. It is a further object to provide a low cost efficient apparatus for separating hydrogen from cyclohexane. It is a further object of this invention to provide an apparatus for separating hydrogen from cyclohexane. It is a further object of this invention to provide a low maintenance apparatus to separate the products of a benzene hydrogenation reaction.

Other aspects, objects and the several advantages of this invention are apparent from a study of the disclosure, drawing and appended claims.

In accordance with a broad embodiment of the invention, an apparatus for separating vapors from liquids is provided wherein a mixture of the vapors and liquids is passed to a first part of a separation vessel, the liquids are grossly separated from the vapors, the liquids being retained in the first section of the separation vessel, the vapors containing some entrained liquid are passed through a second section of the separation vessel through a tortuous path wherein a portion of the entrained liquids separates from the vapors, and the vapors are passed from the separation vessel through a mist extraction zone. Further, in accordance with the invention, a method is provided for separating hydrogen from a benzene hydrogenation reactor products, said method comprising passing the reactor effluent from a benzene hydrogenation process to a separation zone wherein heavier hydrocarbons, such as cyclohexane and unreacted benzene, if present, are separated from a lower portion of the lower boiling point hydrocarbons, such as methane, ethane, propane, isobutane, and hydrogen. The liquid is retained in the first section while the hydrogen and lower boiling point hydrocarbons containing some entrained liquid are passed through a tortuous path into a second separation zone wherein a portion of the entrained liquid, such as cyclohexane, butane and pentane, is separated from the vapors as they pass through the tortuous path. The uncondensed vapors then pass from the second separation zone through a mist extraction zone which removes the remaining portions of the entrained hydrocarbons. The uncondensed vapor consisting primarily of hydrogen is recycled to the benzene hydrogenation reactor.

Further, in accordance with the invention, an apparatus for carrying out the process of the invention is provided. The apparatus is best understood by reference to the accompanying drawing which shows an embodiment of the invention.

Referring to the drawing, line 1 contains the effluent from a reactor in which benzene is being hydrogenated to cyclohexane. This reactor effluent can comprise a large portion of hydrogen, and a large portion of cyclohexane. Other constituents in this line can include methane, ethane, propane, isobutane, n-butane, isopentane, other hexanes and in some cases benzene. The reactor effluent enters vessel 2 at the top thereof and falls into section 3 of vessel 2. A large portion of the hydrogen immediately separates from the cyclohexane. However, the separation is so ebullient that a portion of the liquid becomes entrained in the vapors. The liquid is retained in section 3 by the baffle 4. A portion of liquid in section 3 can pass over baffle 4 into section 5 of the tank. In section 5, there is provided a baffle 6 extending downwardly from the top of vessel 2 and to a point below the top of baffle 4. Baffle 6 is substantially perpendicular to the flow of gases in vessel 2. Thus, there is provided a tortuous path for the vapors passing from section 3 to section 5. A mist extractor 7 is provided at the top of vessel 2 and downstream from baffle 6. The vapors containing essentially hydrogen are extracted from vessel 2 through mist extractor 7 and line 8. It can be seen from the drawing that the vapors must pass over baffle 4 downwardly under baffle 6 and upwardly through mist extractor 7 in order to leave the vessel. This sharp reversal of direction for the vapors and the placement of the baffle plate 6 cause a portion of the entrained liquid to separate in section 5 before the vapors reach the mist extractor 7. In this manner, a more efficient separation of liquid and vapor takes place, as well as an increase in the operating period of the mist extractor between servicing.

Cyclohexane leaves vessel 2 through line 9 and can be recycled to the hydrogenation reactor through line 11 at a constant rate through a pump. Another portion of the cyclohexane is passed through line 12 to a stabilizer. The rate of flow from line 9 to line 12 is controlled by a flow controller 13 which is reset according to a signal obtained from a liquid level senser in section 3 of vessel 2. The liquid separated in section 5 of vessel 2 is passed from section 5 through line 10 and can be combined with the liquid passed from section 3 of the vessel.

The following table shows a material balance in mols per hour for operation of the above-described apparatus for separating the effluent of a benzene hydrogenation reactor.

TABLE
[Mols per hour]

| Stream No. | 1 | 8 | 11 | 12 |
|---|---|---|---|---|
| Hydrogen | 1,461.3 | 1,448.3 | 10.6 | 2.4 |
| Methane | 288.0 | 261.0 | 22.0 | 5.0 |
| Ethane | 100.1 | 68.2 | 26.0 | 5.9 |
| Propane | 119.4 | 55.5 | 52.1 | 11.8 |
| Isobutane | 31.3 | 10.0 | 17.4 | 3.9 |
| N-butane | 16.2 | 4.4 | 9.6 | 2.2 |
| Isopentane | 5.6 | 0.8 | 3.9 | 0.9 |
| Hexanes | 1.5 | | 1.2 | 0.3 |
| Cyclohexane | 1,156.6 | 40.4 | 910.1 | 206.1 |
| Total mol/hr | 3,180.0 | 1,888.6 | 1,052.9 | 238.5 |

The apparatus used for the separation process has the following dimensions:

Length _____ 30'
Diameter _____ 7'
Distance from left side of tank to bottom baffle ___ 20'
Distance from top of tank to top of bottom baffle __ 1' 3"
Distance from right side of tank to top baffle _____ 6' 6"
Distance from top of top baffle to bottom of top baffle _____ 1' 6"

Reasonable variation and modification are possible within the scope of the foregoing disclosure, the drawing and the appended claims to the invention, the essence of which is that a method and apparatus are provided for separating a liquid from a vapor, the method comprising grossly separating the liquid from the vapor, passing the vapor containing some entrained liquid through an unobstructed tortuous path so that a portion of the entrained liquid separates from the vapor and then passing the vapor through a mist extraction zone, the apparatus which comprises a horizontal elongated shell a first section of said shell wherein a mixture of liquid and vapor are introduced, a means for retaining the liquid in said first portion of said shell, a second portion of said shell downstream from said first portion of said shell, a baffle in said second portion of said shell which works in combination with said means for retaining liquid in said first portion of said shell to provide a tortuous path for vapors containing entrained liquids which pass from said first portion of said shell into said second portion of said shell, and a mist extractor downstream and directly behind said baffle for removing entrained liquid from said vapor as said vapor passes from said shell.

1. Apparatus for separating hydrogen from the effluent of a benzene hydrogenation reactor comprising
(a) a horizontally elongated vessel;
(b) means for introducing said effluent containing hydrogen into the top and one end of said horizontal vessel;
(c) a first section of said vessel into which said effluent is introduced;
(d) an upwardly extending baffle plate extending from the bottom of said vessel toward but not reaching the top of said vessel at a fixed distance from said means for introducing said effluent, said baffle being adapted to retain liquid from the effluent in said first section of said vessel;
(e) a second section of said vessel downstream from said first section;
(f) a downwardly extending baffle plate in said second section downstream from said upwardly extending baffle plate, said downwardly extending baffle plate extending from the top of said vessel toward but not reaching the bottom of said vessel to a point below which the top of said upwardly extending baffle extends, said downwardly extending baffle being substantially perpendicular to the direction of flow of gas in said elongated vessel;
(g) means to remove liquid from said first section of said vessel;
(h) a mist extraction zone downstream from said downwardly extending baffle in said second section and on the top of said vessel, said second section being otherwise unobstructed to thereby cause vapors passing through said mist extraction zone from said first section to travel an unobstructed tortuous path, said tortuous path coalescing at least a portion of said entrained liquid passing into said second section of said vessel;
(i) means for removing vapor from the top of said vessel downstream from said downwardly extending baffle and through said mist extraction zone;
(j) means for removing condensed liquid from said second section of said vessel;
(k) conduit means connected to said means of (g) and connected to said means of (j) to remove product hydrocarbon;
(l) valve means in said conduit means of (k);
(m) conduit means connected to said means of (g) and connected to said hydrogenation reactor for passing liquid hydrocarbon product to said hydrogenation reactor as diluent therefor;
(n) means in said conduit means of (m) for passing said liquid hydrocarbon product at a constant rate to said hydrogenation reactor; and
(o) a liquid level control means in said first section of said elongated vessel controlling said valve means of (1) in accordance with the level of liquid in said first section of (c) to maintain said level of liquid substantially constant.

References Cited
UNITED STATES PATENTS 2,610,697  9/1952  Lovelady et al. _____ 55—174 X
2,657,760  11/1953  Glasgow _____ 55—185 X
3,212,238  10/1965  Welch et al. _____ 55—174 X REUBEN FRIEDMAN, *Primary Examiner.*

SAMIH N. ZAHARNA, *Examiner.*

R. W. BURKS, *Assistant Examiner.*